US010445969B2

(12) United States Patent
Schwartz

(10) Patent No.: US 10,445,969 B2
(45) Date of Patent: Oct. 15, 2019

(54) CASSETTE VERIFICATION FOR CASH-DISPENSING MACHINES

(71) Applicant: Global Payments Gaming Services Inc., Las Vegas, NV (US)

(72) Inventor: Andrew J. Schwartz, Las Vegas, NV (US)

(73) Assignee: Global Payments Gaming Services, Inc., Las Vegas, NV (US)

( * ) Notice: Subject to any disclaimer, the term of this patent is extended or adjusted under 35 U.S.C. 154(b) by 86 days.

(21) Appl. No.: 15/410,821

(22) Filed: Jan. 20, 2017

(65) Prior Publication Data

US 2017/0213411 A1 Jul. 27, 2017

Related U.S. Application Data

(60) Provisional application No. 62/281,767, filed on Jan. 22, 2016.

(51) Int. Cl.
*G06F 7/08* (2006.01)
*G07D 11/34* (2019.01)
*G07F 17/32* (2006.01)
*G07D 11/12* (2019.01)

(52) U.S. Cl.
CPC ............. *G07D 11/34* (2019.01); *G07D 11/12* (2019.01); *G07F 17/3246* (2013.01)

(58) Field of Classification Search
CPC ...... G06K 7/08; G06K 7/082; G06Q 20/3433; G06Q 20/3437
USPC ........................................ 235/380, 381, 379
See application file for complete search history.

(56) References Cited

U.S. PATENT DOCUMENTS 8,893,959 B1 * 11/2014 Graef ..................... B65H 29/12 235/379
2002/0125627 A1 * 9/2002 Hand ........................ G07F 7/04 271/10.01
2006/0073883 A1 * 4/2006 Franks, Jr. ............ G06Q 30/02 463/25
2006/0195567 A1 * 8/2006 Mody ..................... G07F 17/32 709/224

* cited by examiner

*Primary Examiner* — Daniel St Cyr
(74) *Attorney, Agent, or Firm* — Mendelsohn Dunleavy, P.C.; Steve Mendelsohn

(57) ABSTRACT

In one embodiment, a cash-dispensing machine, having one or more, single-denomination cash cassettes, such as a kiosk for a casino or other gaming enterprise or a bill-breaking machine, performs a cassette-verification operation in which the machine dispenses bills to a user, and the user inserts those bills back into the machine. The machine verifies that the total number and total monetary value of the inserted bills match the total number and expected total monetary value of the dispensed bills. The total number and expected total monetary value are selected such that (i) there is a different number of bills for each different denomination and (ii) given the available denominations, there is only one combination of the total number of bills having the expected total monetary value. The cassette-verification operation can be used to detect when one or more cash cassettes contain bills of the wrong denomination.

18 Claims, 2 Drawing Sheets

100

CASSETTE VERIFICATION FOR CASH-DISPENSING MACHINES

CROSS-REFERENCE TO RELATED APPLICATIONS

This application claims the benefit of the filing date of U.S. provisional application No. 62/281,767, filed on Jan. 22, 2016, the teachings of which are incorporated herein by reference in their entirety.

BACKGROUND

Field of the Invention

The present invention relates to cash-dispensing machines, such as, without limitation, kiosks for casinos and other gaming enterprises, automated teller machines (ATMs), and bill-breaking machines.

Description of the Related Art

This section introduces aspects that may help facilitate a better understanding of the invention. Accordingly, the statements of this section are to be read in this light and are not to be understood as admissions about what is prior art or what is not prior art.

Many casinos and other gaming enterprises have electronic kiosks that enable their patrons to perform different functions, such as ATM (automatic teller machine) cash withdrawals and bill breaking. In an ATM cash withdrawal, the kiosk dispenses a requested amount of cash to a patron. In a bill-breaking operation, a patron inserts a relatively large-denomination bill into the kiosk and, in return, the kiosk dispenses a number of smaller-denomination bills of equal total monetary value. For example, if a patron inserts a $100 bill into the kiosk, then the kiosk may dispense five $20 bills in return. If a patron inserts a $5 bill into the kiosk, then the kiosk would dispense five $1 bills in return.

A conventional kiosk has different cash cassettes provisioned for different denominations, such as one $1 cassette, two $5 cassettes, two $20 cassettes, and one $100 cassette, where each cash cassette is supposed to be filled with bills of only its corresponding denomination, which are dispensed by the kiosk to support the different types of kiosk functions. Unfortunately, either mistakenly or maliciously, it is possible for a person responsible for loading cash into the cash cassettes to fill a cassette with bills of the wrong denomination. For example, the $1 cassette could be filled with $20 bills. In that case, whenever the kiosk performs a bill-breaking operation for a $5 bill, the kiosk will dispense five $100 bills instead of five $1 bills.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Figure 1:
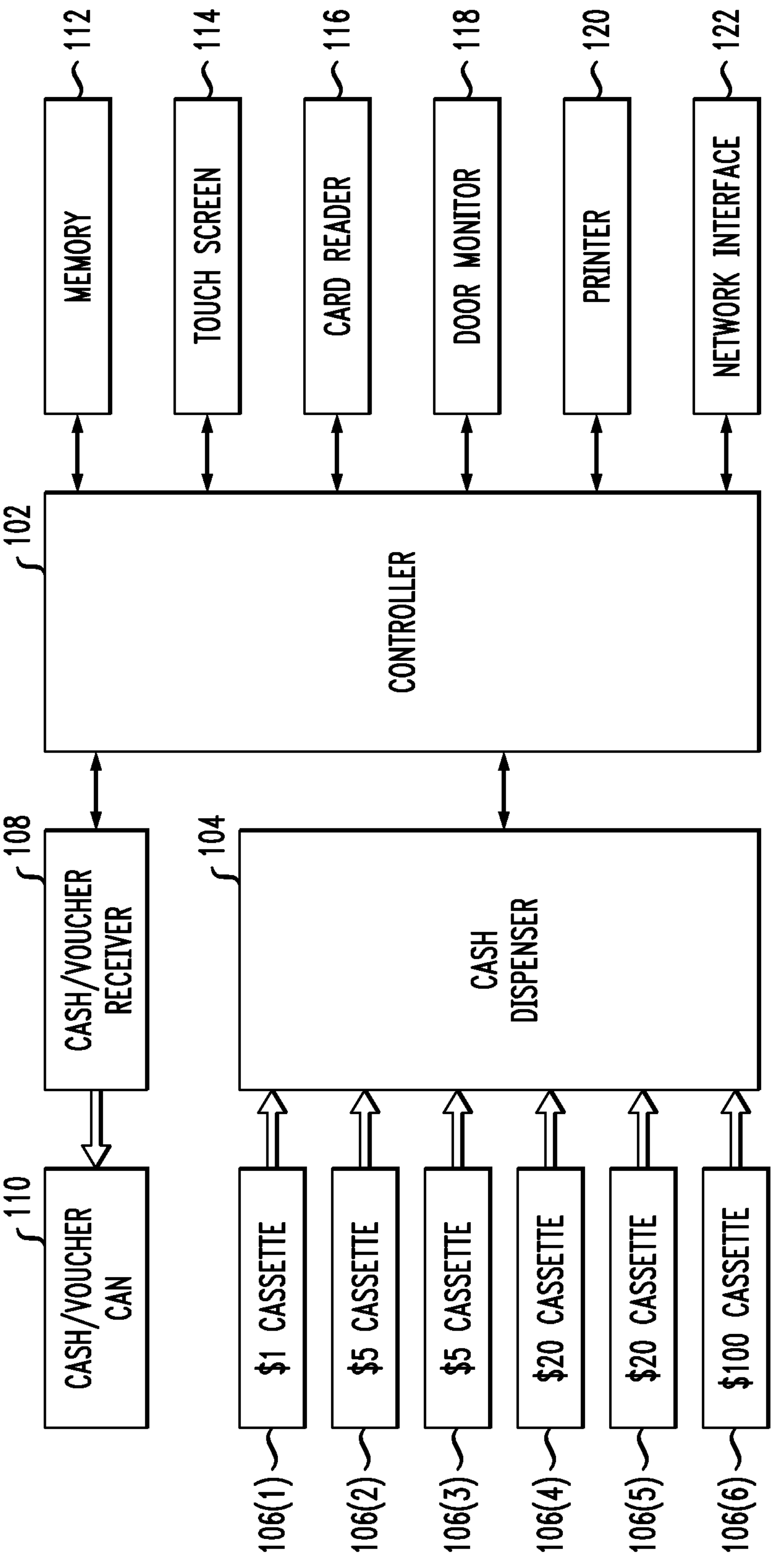
FIG. 1 is a high-level block diagram of a kiosk according to one embodiment of the invention.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms “a,” “an,” and “the,” are intended to include the plural forms as well, unless the context clearly indicates otherwise. It further will be understood that the terms “comprises,” “comprising,” “includes,” and/or “including,” specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

According to certain embodiments of the invention, a kiosk for a casino and other gaming enterprise is configured to support a cassette-verification operation to confirm that its cash cassettes are filled with bills of the proper denominations. As used herein, the term “gaming enterprise” may refer to a single gaming location, such as an individual casino, or a number of different, affiliated gaming locations, such as a plurality of casinos owned or operated by the same company. In a cassette-verification process, the kiosk dispenses a number of bills corresponding to a particular, expected total monetary value to a suitably authorized person, such as the person responsible for loading the cash cassettes into the kiosk, and the person then re-inserts those bills back into the kiosk, which determines whether the number of inserted bills and the total monetary value of those inserted bills match the number and total monetary value of the bills previously dispensed. If the number of inserted bills matches the number of dispensed bills and if the total monetary value of the inserted bills matches the total monetary value of the dispensed bills, then the kiosk will determine that the cash cassettes have been loaded properly with the correct denominations of bills. Otherwise, if the numbers of bills match, but the total monetary values do not match, then the kiosk will determine that at least one cash cassette has been improperly loaded with the wrong denomination of bills.

Note that the number of bills dispensed and the expected total monetary value of those dispensed bills for each cassette-verification operation are specifically selected to prevent a malicious person from succeeding in thwarting the cassette-verification operation. For example, if a kiosk has four cash cassettes provisioned for $1, $5, $10, and $20 bills, respectively, and if the cassette-verification operation involved dispensing one bill from each different cassette, then the expected total monetary value of those four bills would be $36. This hypothetical cassette-verification operation would not provide the kiosk with sufficient information to detect a situation in which (i) the $20 cassette is filled with $1 bills and (ii) the $1 cassette is filled with $20 bills. In that case, the four bills re-inserted into the kiosk would still have a monetary value of $36.

Instead, a kiosk of the invention is configured to perform cassette-verification operations, such that, for each operation, there is only one possible combination of the cassette denominations for the particular number of dispensed bills and the corresponding expected total monetary value. This requires the cassette-verification operation to involve dispensing a different number of bills for each different cassette denomination. For example, for an exemplary kiosk that has four cash cassettes provisioned for $1, $5, $10, and $20 bills, respectively, a cassette-verification operation that dispenses ten bills totaling $59 can only be satisfied by dispensing four $1 bill, three $5 bills, two $10 bills, and one $20 bills. If the $1 cassette were incorrectly filled with $20 bills, and the $20 cassette were incorrectly filled with $1 bills, while the $5 and $10 cassettes are correctly filled, then the ten dispensed bills will have a cash value of (4×$10)+(3×$5)+(2×$10)+(1×$1) or $116. When those ten dispensed bills are re-inserted into the kiosk, the kiosk will detect a mismatch in the total monetary value (i.e., $116 instead of $59) and determine that the cassette-verification operation has failed.

Not only can the kiosk detect a mismatch, but the detected total monetary value of the re-inserted bills will enable the kiosk to uniquely identify which cassette denomination(s) has (have) incorrect bills. For this example, the total monetary value of $116 for ten bills can be achieved by this kiosk only with one $1 bill, three $5 bills, two $10 bills, and four $20 bills. For this kiosk with its four cash cassettes provisioned for $1, $5, $10, and $20 bills, respectively, a total monetary value of $116 for 10 bills will enable the kiosk to determine that the cassette denominations with incorrect bills are $1 and $20. A table can be generated for this particular cassette-verification operation and stored in the kiosk that maps each different possible combination of ten bills to a different unique total monetary value. The kiosk can access this table to determine which cassette denominations are improperly filled based on the corresponding unique total monetary value of the ten re-inserted bills.

There are many different combinations of different numbers of bills of different denominations that can be used for cassette-verification operations. For example, another possible cassette-verification operation involves dispensing ten bills totaling $121, which can only be satisfied by dispensing one $1 bills, two $5 bills, three $10 bills, and four $20 bill. If the $5 cassette is incorrectly filled with $10 bills, while the $1, $10, and $20 cassettes are correctly filled, then the ten dispensed bills will have a cash value of (1×$1)+(2×$10)+(3×$10)+(4×$20) or $131, and again the kiosk will detect a mismatch for the cassette-verification operation and be able to identify that the $5 cassette is incorrectly filled with $10 bills.

In some implementations, a kiosk is configured to perform cassette-verification operations involving different numbers of bills and/or different expected total monetary values. As an added security measure, the kiosk randomly or otherwise selects different combinations of the different cassette-verification operations. The user operating the kiosk to perform a cassette-verification operation does not need to know ahead of time either the total number of bills or the expected total monetary value of any given cassette-verification operation. The only thing the user is expected to do is to re-insert whatever bills are dispensed. Nor does the order in which the bills are re-inserted matter.

Some kiosks may have multiple cash cassettes for particular denominations. For example, a kiosk may have one $1 cassette, two $5 cassettes, two $20 cassettes, and one $100 cassette. In that case, the kiosk can be configured to select cassette-verification operations involving at least two $20 bills and at least two $5 bills such that, for each cassette-verification operation, the kiosk is configured to dispense at least one bill from each cassette, such that each cassette-verification operation involves all of the different cash cassettes in the kiosk. Note that it is not a requirement that each different cash cassette be involved in each different cassette-verification operation, although some kiosks may be so configured.

FIG. 1 is a high-level block diagram of a kiosk 100 according to one embodiment of the invention having six cash cassettes: one $1 cassette 106(1), two $5 cassettes 106(2) and 106(3), two $20 cassettes 106(4) and 106(5), and one $100 cassette 106(6). As shown in FIG. 1, kiosk 100 has the following elements configured to perform the following functions that support user operation of kiosk 100:

- Controller 102 configured to control all of the automated operations of kiosk 100;
- Cash dispenser 104 configured to retrieve bills from the appropriate cash cassettes 106 and present the retrieved bills to the user;
- Cash/voucher receiver 108 configured to receive paper currency and vouchers from the user and store them in the cash/voucher can 110;
- Memory 112 configured to store software programs and data for the controller 102;
- Touch screen 114 configured to display textual and graphical information to the user and to receive manual data inputs from the user;
- Card reader 116 configured to receive and read the user's player card, credit/debit card, or identification card;
- Door monitor 118 configured to detect and record access to the can 110 and the cash cassettes 106. The door monitor 118 would also indicate that the kiosk 100 is secure and ready to perform a cassette-verification operation;
- Printer 120 configured to print receipts and vouchers for the user; and
- Network interface 122 configured to enable the controller 102 to communicate with one or more other nodes (not shown), such as a centralized server, of a distributed casino network via wireless and/or wire-line communication links depending on the particular implementation and deployment.

In certain embodiments, the cash dispenser 104 may be either a present-type cash dispenser that collects all of the bills from the appropriate cash cassettes 106 and presents them to the user as a single stack of bills or a dispense-type cash dispenser that sequentially retrieves from an appropriate cash cassette 106 and presents to the user one bill at a time.

When kiosk 100 is deployed in a casino or other gaming enterprise, the kiosk is configured to support the normal range of functions provided to patrons of those enterprises. In addition, kiosk 100 is configured to support the cassette-verification operations of this invention. For such cassette-verification operations, the user of the kiosk is someone who has special access authorization, such as someone authorized to access the cash cassettes 106 to replace and/or refill cash cassettes that are empty or sufficiently depleted. Such an authorized user may have a special identification card (to be inserted into the card reader 116) and/or a special identification code (to be entered using the touch screen 114) that enables that user to secure that access that is otherwise unavailable to routine patrons. In addition or instead, an authorized user may have a key to unlock a locked door on the kiosk 100 that otherwise prevents access to the cash cassettes.

Figure 2:
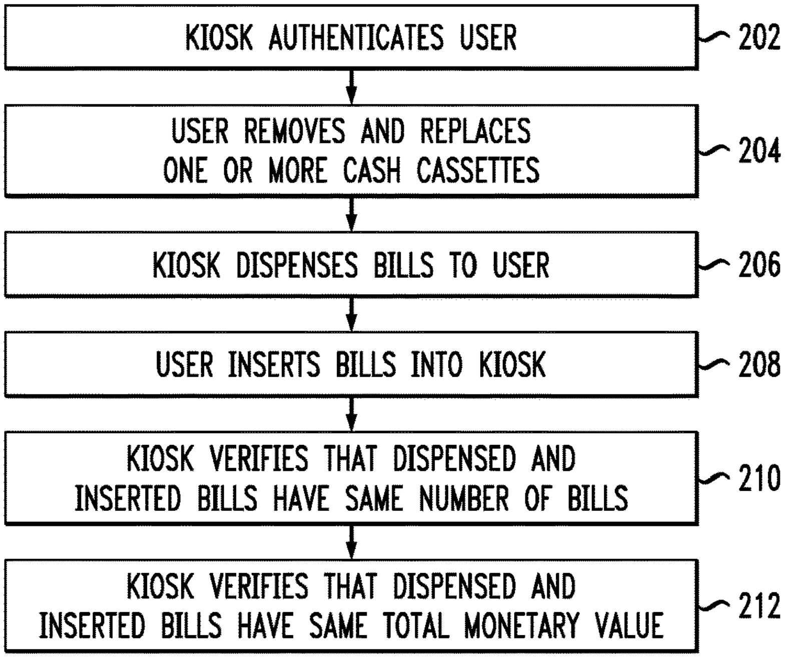
FIG. 2 is a flow diagram for the processing involved in a cassette-verification operation according to one embodiment of the invention.

FIG. 2 is a flow diagram for the processing involved in a cassette-verification operation according to one embodiment of the invention. The processing begins in step 202, where kiosk 100 authenticates the user as being an authorized user who is authorized to perform the cassette-verification operation. As suggested previously, this authentication operation could involve the user inserting a special identification card into the card reader 116, which reads and transmits user identification information from the card to the controller 102, which accesses data in memory 112 to determine whether the user is an authorized user. In addition or instead, the authorization could involve the user entering a special identification code using the touch screen 114, which transmits that code to the controller 102, which accesses data in memory 112 to determine whether the user is authorized. In addition or instead, the user may have a key to unlock a locked door that otherwise prevents access to the cash cassettes 106. The door monitor 118 may be configured to detect opening of the door as well as removal and replacement of cash cassettes 106 from and into the kiosk 100.

Assuming that the user is authorized to perform the cassette-verification operation, processing continues to step 204, where the user replaces or refills one or more of the cash cassettes 106. Note that step 204 is optional; cassette-verification operations can be performed at any time by authorized users without any of the cash cassettes 106 being replaced or refilled. When the cassette replacement/refill operation of step 204 is completed (or skipped), processing continues to step 206, where the controller 102 instructs the cash dispenser 104 to retrieve a specified number of bills from each different cash cassette 106 and presents those bills to the authorized user. Note that the number of bills of each denomination are selected to ensure that the expected total monetary value of the total number of bills can be achieved with only one possible combination of that same total number of bills for the particular set of denominations with which the cash cassettes 106 of the kiosk 100 are provisioned.

In step 208, the user inserts the dispensed bills into the cash receiver 108, which identifies and reports the monetary value of each inserted bill to the controller 102 and deposits the bills into the cash/voucher can 110. Note that, for security reasons, the kiosk 100 may be configured to impose a time limit on the duration between the end of the bill dispensing of step 206 and the end of the bill insertion of step 208. The kiosk 100 may be configured to determine that the cassette-verification operation has failed, if the same number of bills are not re-inserted before the end of the time limit.

In step 210, the controller 102 verifies whether the total number of bills that were inserted in step 208 is equal to the total number of bills that were dispensed in step 206. In step 212, the controller 102 verifies whether the total monetary value of the bills that were inserted in step 208 is equal to the expected total monetary value of the bills that were dispensed in step 206. If both of steps 210 and 212 are satisfied, then the controller 102 determines that the kiosk 100 has passed this particular cassette-verification operation (i.e., the cassette-verification operation has a positive result). In that case, the controller 102 can send a "cassette-verification operation passed" message via the network interface 122 to a centralized server of the network. If either or both of steps 210 and 212 are not satisfied, then the controller 102 determines that the kiosk 100 has failed this particular cassette-verification operation (i.e., the cassette-verification operation has a negative result). In that case, the controller 102 can send a "cassette-verification operation failed" message via the network interface 122 to the centralized server for further appropriate handling, which might include de-activating the kiosk 100 until the situation is corrected.

Depending on the implementation, steps 206-212 may be repeated one or more times using different total numbers of bills and different expected total monetary values to gain further confidence in the properness of the loading of the cash cassettes 106.

In some implementations, the kiosk 100 is programmed with a number of different instances of cassette-verification operations involving different total numbers of bills and/or different expected total monetary values of those bills. The kiosk 100 may be programmed to randomly select from its available pre-programmed cassette-verification operations for any given operation. This inhibits a user from inserting a substitute set of bills different from the set of dispensed bills during a cassette-verification operation in an attempt to have the kiosk 100 generate a false-positive result (i.e., determining that improperly loaded cash cassettes are properly loaded).

Note that, when a kiosk has multiple cash cassettes of the same monetary value, like kiosk 100 of FIG. 1, which has two $5 cassettes 106(2) and 106(3) and two $20 cassettes 106(4) and 106(5), during normal kiosk operations involving multiple bills having the same monetary value, the kiosk may retrieve those multiple bills from a single cash cassette. For example, during a normal bill-breaking operation in which a user inserts a $100 bill, kiosk 100 may retrieve five $20 bills from $20 cassette 106(4). However, during a cassette-verification operation involving five $20 bills, controller 102 is configured to ensure that at least one $20 bill is retrieved from $20 cassette 106(4) and the remaining one or more $20 bills are retrieved from $20 cassette 106(5). This applies to cassette-verification operations in which at least one bill is required to be retrieved from each different cash cassette 106.

Although the invention has been discussed in the context of cassette-verification operations in which at least one bill is retrieved from each different cash cassette, in other implementations, bills are not retrieved from at least one of the cash cassettes during at least some of the cassette-verification operations. Note that, in theory, a cassette-verification operation could involve as few as a single cash cassette, where the kiosk dispenses a number of bills and then verifies that there are as many reinserted bills and that they are of the appropriate denomination. As such, cassette-verification operations could be performed for kiosks and other cash-dispensing machines having one or more cash cassettes provisioned for only a single denomination, such as $20 bills.

Although the invention has been described in the context of a kiosk for a casino or other gaming enterprise that is configured to dispense paper currency of multiple different denominations, in general, the invention can be implemented in the context of other types of cash-dispensing machines, such as (without limitation) non-gaming kiosks, automated teller machines (ATMs), voucher-redemption machines, and bill-breaking machines.

Although the invention has been described in the context of a cash-dispensing machine that has both a dispenser that dispenses paper currency and a receiver that receives paper currency and determines the monetary value of each inserted bill, the invention is not necessarily so limited. In an alternative implementation of a cassette-verification operation, the cash-dispensing machine dispenses a set of bills to the user, who then manually determines the total monetary value of those bills and enters that value using the machine's data input device (e.g., touch screen or keypad). Knowing the expected total monetary value of the cash that was dispensed to the user, the kiosk would be able to determine if the value entered by the user matched the expected dispensed value. Rather than reinserting the bills into the machine, the user may be required to turn the bills over to an employee of the casino, such as a teller working in the casino cage. For a kiosk configured in a distributed casino network, a server node of that distributed network operated by the teller would receive from the kiosk information about the expected dispensed total monetary value, thereby enabling the teller to determine whether the amount of cash turned in by the user matched the expected dispensed total monetary value. If any of these values failed to match, then the cassette-verification operation would be determined to have failed, and the machine can be de-activated. Note that a cash-dispensing machine that supports this type of cassette-verification operation does not need to have a cash receiver that can determine the monetary value of each inserted bill.

Figure 3:
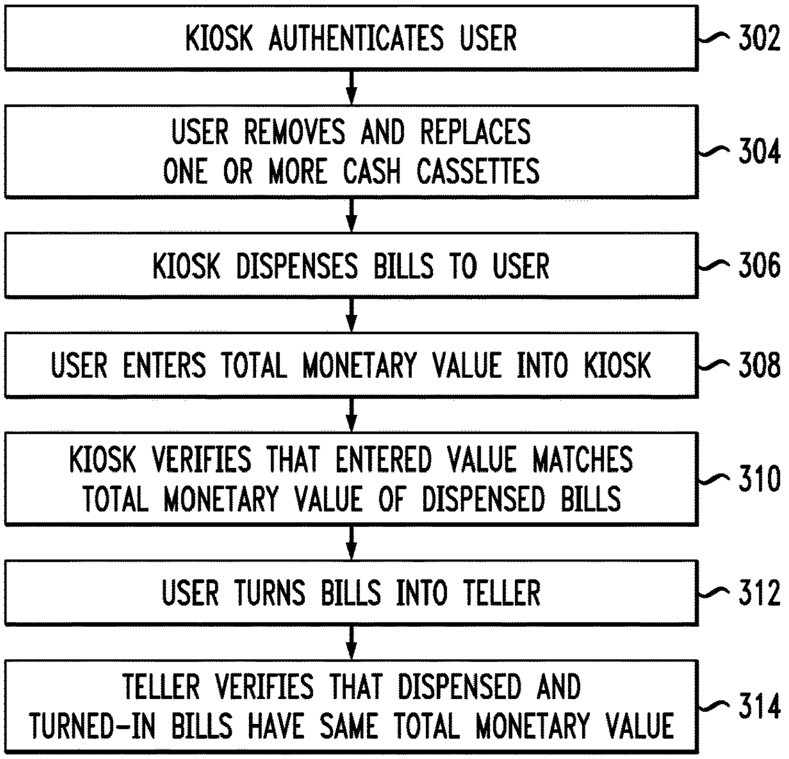
FIG. 3 is a flow diagram for the processing involved in a cassette-verification operation according to another embodiment of the invention.

FIG. 3 is a flow diagram for the processing involved in a cassette-verification operation according to this other embodiment of the invention. Steps 302-306 of FIG. 3 are identical to steps 202-206 of FIG. 2. In step 308, the user enters the total monetary value of the dispensed bills using the kiosk's data input device, and, in step 310, the controller determines whether the inputted total monetary value matches the expected total monetary value of the dispensed bills. In addition, in step 312, the user turns the dispensed bills over to a teller, who determines whether the total monetary value of the turned-in bills matches the expected total monetary value of the dispensed bills.

In another implementation, the user does not enter any value into the machine's data input device. Instead, the user just turns the bills over to the teller who determines whether the cassette-verification operation passes or fails as in the previous paragraph. Referring to FIG. 3, steps 308 and 310 are omitted for this implementation.

As used herein, the term "bill" refers to a single note or item of paper currency having a specific monetary value. For example, a one-dollar note is a bill, and two twenty-dollar notes are two bills.

As used herein, the term "provisioned" refers to the proper use of a cash cassette. For example, a cash cassette that is provisioned to store one-dollar bills is supposed to store only one-dollar bills even if the cash cassette ends up being improperly loaded with bills other than one-dollar bills.

In certain embodiments, the invention is a cash-dispensing machine comprising (i) one or more cash cassettes, each cash cassette provisioned to store bills of a single, specified denomination, (ii) a cash dispenser configured to dispense bills from the one or more cash cassettes to a user of the machine, (iii) a cash receiver configured to receive bills from the user and identify the denomination of each received bill, and (iv) a controller connected to communicate with the cash dispenser and the cash receiver and configured to support a cassette-verification operation during which (1) the controller controls the cash dispenser to dispense, to the user, a first set of bills from the cash cassettes having an expected first total monetary value, (2) the cash receiver receives, from the user, a second set of bills having a second total monetary value, and (3) the controller determines that the cassette-verification operation has a positive result when the controller determines that (i) the second set has the same number of bills as the first set and (ii) the second total monetary value is equal to the expected first total monetary value; otherwise, the controller determines that the cassette-verification operation has a negative result.

In certain embodiments, the machine comprises a plurality of cash cassettes, wherein (i) at least one of the cash cassettes is provisioned to store bills of a first denomination and (ii) at least one other of the cash cassettes is provisioned to store bills of a second denomination different from the first denomination.

In certain embodiments, the first set of bills comprises (i) a first number of bills of the first denomination and (ii) a second number of bills of the second denomination, wherein the second number is different from the first number; and the expected first total monetary value can be achieved only with the first number of bills of the first denomination and the second number of bills of the second denomination.

In certain embodiments, for the different denominations associated with the cash cassettes, (i) only one combination of the number of bills in the first set has the expected first total monetary value and (ii) each different denomination has a different number of bills.

In certain embodiments, the cash cassettes comprise at least two cash cassettes provisioned to store bills of the same denomination, and, during the cassette-verification operation, the controller controls the cash dispenser to retrieve at least one bill from each of the at least two cash cassettes provisioned to store bills of the same denomination.

In certain embodiments, during the cassette-verification operation, the controller controls the cash dispenser to retrieve at least one bill from each of the cash cassettes.

In certain embodiments, the controller supports a bill-breaking operation in which (i) the cash receiver receives a first bill and (ii) the cash dispenser retrieves a plurality of bills from the cash cassettes having a total monetary value equal to the denomination of the first bill.

In certain embodiments, the machine restricts implementation of the cassette-verification operation to authorized users.

In certain embodiments, the controller determines whether the user is an authorized user before enabling the user to perform the cassette-verification operation.

In certain embodiments, the controller identifies each denomination for which one or more cash cassettes are improperly filled with bills.

In certain embodiments, the controller enforces a time limit between the cash dispenser dispensing the first set of bills and the cash receiver receiving the second set of bills, such that the controller determines that the cassette-verification operation has a negative result if the second set of bills is not received by the end of the time limit.

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

What is claimed is:

1. A cash-dispensing machine comprising: one or more cash cassettes, each cash cassette provisioned to store bills of a single, specified denomination; a cash dispenser configured to dispense bills from the one or more cash cassettes to a user of the machine; a cash receiver configured to receive bills from the user and identify the denomination of each received bill; and a controller connected to communicate with the cash dispenser and the cash receiver and configured to support a cassette-verification operation during which: the controller selects, independent of any input from the user, (i) an expected first total monetary value for a first set of bills and (ii) expected denominations of the bills in the first set of bills; the controller controls the cash dispenser to dispense, to the user, the first set of bills from the cash cassettes having the expected first total monetary value; the cash receiver receives, from the user, a second set of bills having a second total monetary value, wherein the second set of bills may be, but does not have to be, the first set of bills; and the controller compares (i) the number of bills in the second set of bills to the number of bills in the first set of bills and (ii) the second total monetary value to the expected first total monetary value and determines that the cassette-verification operation has a positive result when the controller determines that (i) the second set has the same number of bills as the first set and (ii) the second total monetary value is equal to the expected first total monetary value; otherwise, the controller determines that the cassette-verification operation has a negative result indicating that at least one cash cassette is not filled with the provisioned specified denomination of bills, wherein the controller is configured to enforce a time limit between the cash dispenser dispensing the first set of bills and the cash receiver receiving the second set of bills, such that the controller determines that the cassette-verification operation has a negative result if the second set of bills is not received by the end of the time limit.

2. The machine of claim 1, comprising a plurality of cash cassettes, wherein: at least one of the cash cassettes is provisioned to store bills of a first denomination; and at least one other of the cash cassettes is provisioned to store bills of a second denomination different from the first denomination.

3. The machine of claim 2, wherein: the first set of bills comprises (i) a first number of bills of the first denomination and (ii) a second number of bills of the second denomination, wherein the second number is different from the first number; and the expected first total monetary value can be achieved only with the first number of bills of the first denomination and the second number of bills of the second denomination.

4. The machine of claim 2, wherein, for the different denominations associated with the cash cassettes, (i) only one combination of the number of bills in the first set has the expected first total monetary value and (ii) each different denomination has a different number of bills.

5. The machine of claim 2, wherein: the cash cassettes comprise at least two cash cassettes provisioned to store bills of the same denomination; and during the cassette-verification operation, the controller controls the cash dispenser to retrieve at least one bill from each of the at least two cash cassettes provisioned to store bills of the same denomination.

6. The machine of claim 2, wherein, during the cassette-verification operation, the controller controls the cash dispenser to retrieve at least one bill from each of the cash cassettes.

7. The machine of claim 1, wherein the controller is configured to support a bill-breaking operation in which (i) the cash receiver receives a first bill and (ii) the cash dispenser retrieves a plurality of bills from the cash cassettes having a total monetary value equal to the denomination of the first bill.

8. The machine of claim 1, wherein the machine is configured to restrict implementation of the cassette-verification operation to authorized users.

9. The machine of claim 8, wherein the controller is configured to determine whether the user is an authorized user before enabling the user to perform the cassette-verification operation.

10. The machine of claim 1, wherein the controller is configured to identify each denomination for which one or more cash cassettes are improperly filled with bills.

11. The machine of claim 1, comprising a plurality of cash cassettes, wherein: at least one of the cash cassettes is provisioned to store bills of a first denomination; at least one other of the cash cassettes is provisioned to store bills of a second denomination different from the first denomination; the first set of bills comprises (i) a first number of bills of the first denomination and (ii) a second number of bills of the second denomination, wherein the second number is different from the first number; the expected first total monetary value can be achieved only with the first number of bills of the first denomination and the second number of bills of the second denomination; for the different denominations associated with the cash cassettes, (i) only one combination of the number of bills in the first set has the expected first total monetary value and (ii) each different denomination has a different number of bills; during the cassette-verification operation, the controller controls the cash dispenser to retrieve at least one bill from each of the cash cassettes; the controller is configured to support a bill-breaking operation in which (i) the cash receiver receives a first bill and (ii) the cash dispenser retrieves a plurality of bills from the cash cassettes having a total monetary value equal to the denomination of the first bill; the machine is configured to restrict implementation of the cassette-verification operation to authorized users; the controller is configured to determine whether the user is an authorized user before enabling the user to perform the cassette-verification operation; and the controller is configured to identify each denomination for which one or more cash cassettes are improperly filled with bills.

12. The machine of claim 11, wherein: the cash cassettes comprise at least two cash cassettes provisioned to store bills of the same denomination; during the cassette-verification operation, the controller controls the cash dispenser to retrieve at least one bill from each of the at least two cash cassettes provisioned to store bills of the same denomination.

13. A cash-dispensing machine comprising: one or more cash cassettes, each cash cassette provisioned to store bills of a single, specified denomination; a cash dispenser configured to dispense bills from the one or more cash cassettes to a user of the machine; a data input device configured to receive information input by the user; and a controller connected to communicate with the cash dispenser and the data input device and configured to support a cassette-verification operation during which: the controller selects, independent of any input from the user, (i) an expected first total monetary value for a first set of bills and (ii) expected denominations of the bills in the first set of bills; the controller controls the cash dispenser to dispense, to the user, the first set of bills from the cash cassettes having the expected first total monetary value; the data input device receives, from the user, information identifying a second total monetary value; and the controller compares the second total monetary value to the expected first total monetary value and determines that the cassette-verification operation has a positive result when the controller determines that the second total monetary value is equal to the expected first total monetary value; otherwise, the controller determines that the cassette-verification operation has a negative result indicating that at least one cash cassette is not filled with the provisioned specified denomination of bills, wherein the controller is configured to enforce a time limit between the cash dispenser dispensing the first set of bills and the data input device receiving the information identifying the second total monetary value, such that the controller determines that the cassette-verification operation has a negative result if the information is not received by the end of the time limit.

14. A method for performing a cassette-verification operation for a cash-dispensing machine having one or more cash cassettes, each cash cassette provisioned to store bills of a single, specified denomination, the method comprising:

(a) selecting, independent of any input from a user of the cash-dispensing machine, (i) an expected first total monetary value for a first set of bills and (ii) expected denominations of the bills in the first set of bills;

(b) dispensing the first set of bills from the cash cassettes having the expected first total monetary value;

(c) determining a second total monetary value for the first set of bills; and (d) comparing the second total monetary value to the expected first total monetary value and determining that the cassette-verification operation has a positive result if the second total monetary value is determined to be equal to the expected first total monetary value; otherwise, determining that the cassette-verification operation has a negative result indicating that at least one cash cassette is not filled with the provisioned, specified denomination of bills, wherein the controller is configured to enforce a time limit between step (b) and step (c), such that the controller determines that the cassette-verification operation has a negative result if step (c) is not performed by the end of the time limit.

15. The method of claim 14, wherein step (b) is performed by a cash receiver of the cash-dispensing machine receiving the first set of bills and determining the second total monetary value for the first set of bills.

16. The method of claim 14, wherein step (b) is performed by a user inputting information identifying the second total monetary value into the cash-dispensing machine.

17. The method of claim 14, wherein steps (b) and (c) are performed outside of the cash-dispensing machine.

18. A cash-dispensing machine comprising: one or more cash cassettes, each cash cassette provisioned to store bills of a single, specified denomination; a cash dispenser configured to dispense bills from the one or more cash cassettes to a user of the machine; a cash receiver configured to receive bills from the user and identify the denomination of each received bill; and a controller connected to communicate with the cash dispenser and the cash receiver and configured to support a cassette-verification operation during which: the controller controls the cash dispenser to dispense, to the user, a first set of bills from the cash cassettes having an expected first total monetary value; the cash receiver receives, from the user, a second set of bills having a second total monetary value, wherein the second set of bills may be, but does not have to be, the first set of bills; the controller compares (i) the number of bills in the second set of bills to the number of bills in the first set of bills and (ii) the second total monetary value to the expected first total monetary value and determines that the cassette-verification operation has a positive result when the controller determines that (i) the second set has the same number of bills as the first set and (ii) the second total monetary value is equal to the expected first total monetary value; otherwise, the controller determines that the cassette-verification operation has a negative result indicating that at least one cash cassette is not filled with the provisioned specified denomination of bills; and the controller is configured to enforce a time limit between the cash dispenser dispensing the first set of bills and the cash receiver receiving the second set of bills, such that the controller determines that the cassette-verification operation has a negative result if the second set of bills is not received by the end of the time limit.

* * * * *